(12) United States Patent
Zheng et al.

(10) Patent No.: US 12,153,769 B2
(45) Date of Patent: Nov. 26, 2024

(54) DISPLAY PANEL AND DISPLAY DEVICE

(71) Applicant: Wuhan Tianma Microelectronics Co., Ltd., Wuhan (CN)

(72) Inventors: Yaofei Zheng, Wuhan (CN); Xiaofeng Guo, Wuhan (CN)

(73) Assignee: Wuhan Tianma Microelectronics Co., Ltd., Wuhan (CN)

( * ) Notice: Subject to any disclaimer, the term of this patent is extended or adjusted under 35 U.S.C. 154(b) by 23 days.

(21) Appl. No.: 18/141,649

(22) Filed: May 1, 2023

(65) Prior Publication Data

US 2023/0259242 A1    Aug. 17, 2023

(30) Foreign Application Priority Data

Nov. 3, 2022 (CN) .......................... 202211370571.5

(51) Int. Cl.
| | |
|---|---|
| *G06F 3/044* | (2006.01) |
| *G06F 3/041* | (2006.01) |
| *G09G 3/20* | (2006.01) |

(52) U.S. Cl.
CPC .......... *G06F 3/0446* (2019.05); *G06F 3/0412* (2013.01); *G09G 3/2096* (2013.01); *G06F 2203/04102* (2013.01); *G09G 2310/0267* (2013.01); *G09G 2380/02* (2013.01)

(58) Field of Classification Search
CPC .... G06F 3/0446; G06F 3/0412; G06F 3/2096; G06F 2203/04102; G09G 2310/0267; G09G 2380/02
See application file for complete search history.

(56) References Cited

U.S. PATENT DOCUMENTS

| | | | | |
|---|---|---|---|---|
| 2013/0106739 A1* | 5/2013 | Lee | ........................ | G06F 3/0443 345/173 |
| 2021/0223940 A1* | 7/2021 | Li | ........................ | G06F 3/04186 |

FOREIGN PATENT DOCUMENTS

| | | |
|---|---|---|
| CN | 107180848 A | 9/2017 |
| CN | 112306272 A | 2/2021 |
| CN | 113970985 A | 1/2022 |

\* cited by examiner

*Primary Examiner* — Peter D McLoone
(74) *Attorney, Agent, or Firm* — KDW Firm PLLC (57) ABSTRACT

Disclosed are a display panel and a display device. The display panel includes a touch insulating layer. The display panel further includes a display region and a non-display region, where the non-display region includes a first non-display region and a bending region, and the first non-display region is located between the bending region and the display region. The first non-display region includes a first sub-non-display region and a second sub-non-display region, where within the first sub-non-display region, the touch insulating layer includes multiple touch via holes, and within the second sub-non-display region, the touch insulating layer includes a first hollow portion, and the first hollow portion penetrates the touch insulating layer.

17 Claims, 7 Drawing Sheets

DISPLAY PANEL AND DISPLAY DEVICE

CROSS-REFERENCE TO RELATED APPLICATION(S)

This application claims priority to Chinese Patent Application No. 202211370571.5 filed Nov. 3, 2022, the disclosure of which is incorporated herein by reference in its entirety.

TECHNICAL FIELD

The present disclosure relates to the field of display technologies and, in particular, to a display panel and a display device.

BACKGROUND

As an important part of human-computer interaction, a touch screen has been widely used in electronic product such as mobile phone and tablet computer.

However, there are still some problems with touch screens that need to be improved.

SUMMARY

An embodiment of the present disclosure provides a display panel and a display device, in which a touch insulating layer located in a second sub-non-display region is provided with a first hollow portion, and a display and a touch effect of the display panel are ensured by using the first hollow portion as a release channel of water vapor and stress.

In a first aspect, an embodiment of the present disclosure provides a display panel including a touch structure, where the touch structure includes a touch insulating layer.

The display panel further includes a display region and a non-display region, where the non-display region includes a first non-display region and a bending region, and the first non-display region is located between the bending region and the display region.

The first non-display region includes a first sub-non-display region and a second sub-non-display region, where in the first sub-non-display region, the touch insulating layer includes multiple touch controls via holes, and in the second sub-non-display region, the touch insulating layer includes a first hollow portion, and the first hollow portion penetrates the touch insulating layer.

In a second aspect, an embodiment of the present disclosure provides a display device including the display panel described in the first aspect.

BRIEF DESCRIPTION OF DRAWINGS

To illustrate technical solutions in embodiments of the present disclosure more clearly, drawings used in description of the embodiments will be briefly described below. Apparently, the drawings described below illustrate part of the embodiments of the present disclosure, and those of ordinary skill in the art may obtain other drawings based on the drawings described below on the premise that no creative work is done.

DETAILED DESCRIPTION

The technical solutions in embodiments of the present disclosure will be described clearly and completely in conjunction with the drawings in the embodiments of the present disclosure from which the solutions of the present disclosure will be better understood by those skilled in the art. Apparently, the embodiments described below are part, not all, of the embodiments of the present disclosure. Based on the embodiments described in the present disclosure, all other embodiments obtained by those of ordinary skill in the art on the premise that no creative work is done are within the scope of the present disclosure.

It is to be noted that the terms "first", "second" and the like in the description, claims and drawings of the present disclosure are used to distinguish between similar objects and are not necessarily used to describe a particular order or sequence. It should be understood that the data used in this manner is interchangeable in appropriate cases so that the embodiments of the present disclosure described here may also be implemented in a sequence not illustrated or described here. In addition, terms "comprising", "including" and any other variations thereof are intended to encompass a non-exclusive inclusion. For example, a system, product or device that includes a series of units not only includes the expressly listed steps or units but may also include other units that are not expressly listed or are inherent to such product or device.

Figure 1:
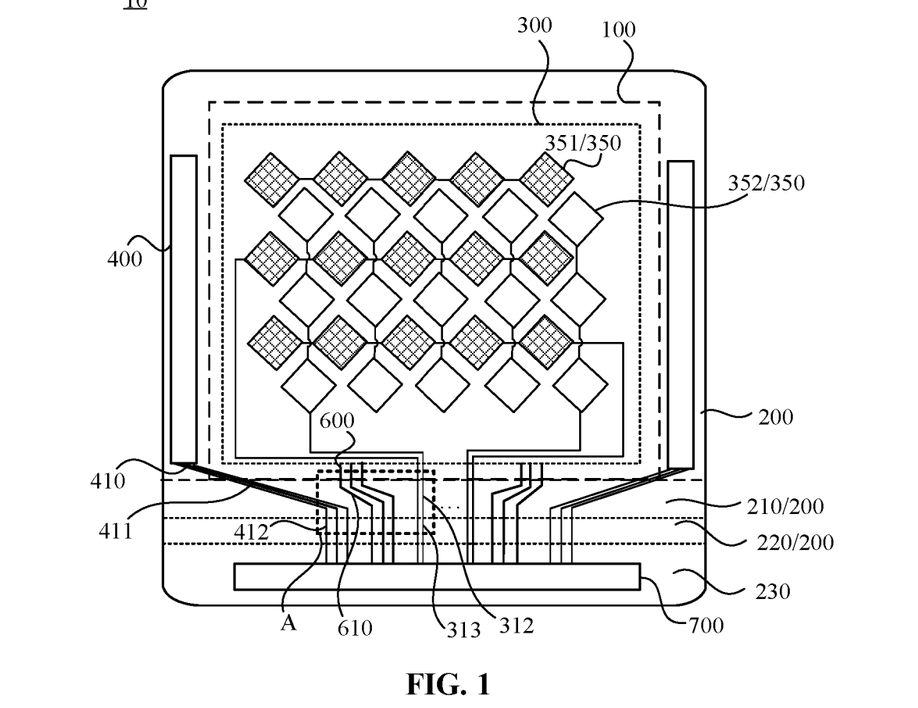
FIG. 1 is a structure diagram of a display panel according to an embodiment of the present disclosure.
Figure 2:
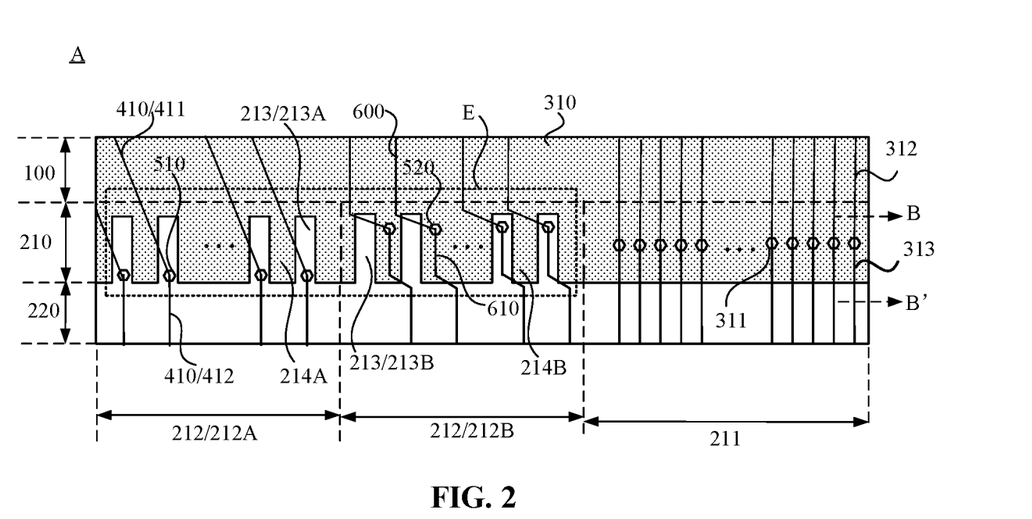
FIG. 2 is an enlarged schematic diagram of a region A in FIG. 1.
Figure 3:
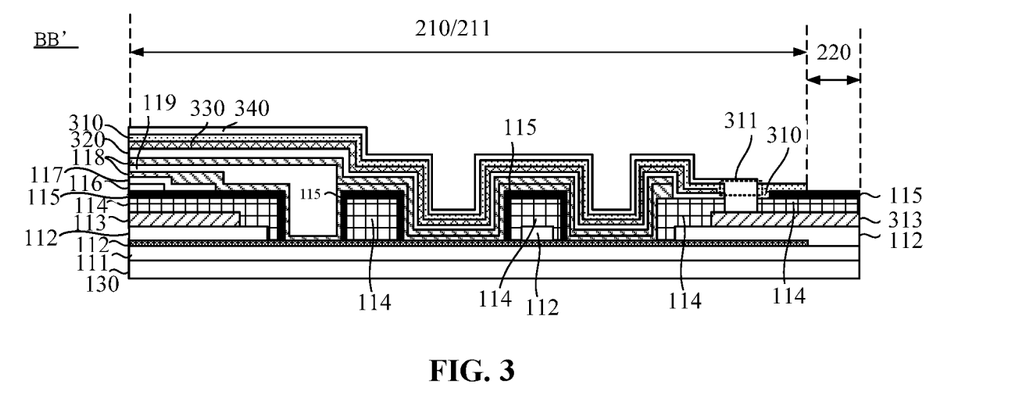
FIG. 3 is a sectional view taken along a section line B-B' in FIG. 2.
Figure 4:
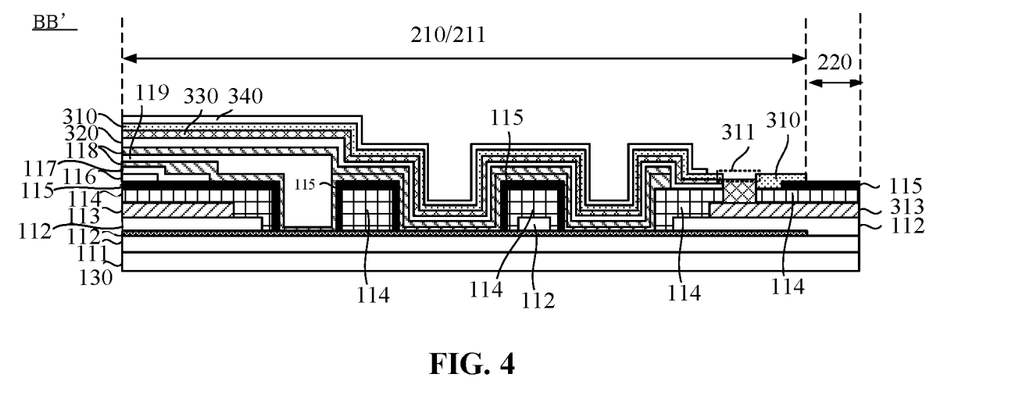
FIG. 4 is another sectional view taken along a section line B-B' in FIG. 2.

FIG. 1 is a structure diagram of a display panel according to an embodiment of the present disclosure, FIG. 2 is an enlarged schematic diagram of a region A in FIG. 1, FIG. 3 is a sectional view taken along a section line B-B' in FIG. 2, and FIG. 4 is another sectional view taken along a section line B-B' in FIG. 2. As shown in FIGS. 1 to 4, a display panel 10 is provided by the embodiment of the present disclosure, the display panel 10 includes a touch structure 300, and the touch structure 300 includes a touch insulating layer 310. The display panel 10 further includes a display region 100 and a non-display region 200, where the non-display region 200 includes a first non-display region 210 and a bending region 220, and the first non-display region 210 is located between the bending region 220 and the display region 100. The first non-display region 210 includes a first sub-non-display region 211 and a second sub-non-display region 212, where within the first sub-non-display region 211, the touch insulating layer 310 includes multiple touch via holes 311, and within the second sub-non-display region 312, the touch insulating layer 310 includes first hollow portions 213, and the first hollow portions penetrate the touch insulating layer 310.

In an embodiment, the display panel 10 includes the display region 100 and the non-display region 200, the non-display region 200 may be a border region located on a side of the display region 100, and the position relationship between the display region 110 and the non-display region 120 is not specifically limited in the embodiment of the present disclosure. The display region 100 includes multiple sub-pixels and display signal lines connected to the multiple sub-pixels, such as data signal lines 600. The display signal lines are electrically connected to the multiple sub-pixels and a display driver chip, respectively, for transmitting display signals to the multiple sub-pixels to achieve a display function of the display panel 10. The display panel 100 further includes the touch structure 300, and the touch structure 300 includes touch electrodes 350 and touch traces 312. The touch traces 312 are electrically connected to the touch electrodes 350 and the touch driver chip, respectively, and the touch driver chip feeds back the touch drive signals to the touch electrodes 350 through the touch traces 312 and receives the touch sensing signals fed back by the touch traces, thereby achieving the touch control function of the display panel 10. Optionally, the touch electrodes 350 may be transparent touch electrodes or metal grid electrodes so that light emitted by sub-pixels disposed below the touch electrodes 350 can be emitted through the touch electrodes 500. Optionally, the display driver chip and the touch driver chip may be provided independently or integrated, which is not limited by the embodiment of the present disclosure. In FIG. 1, only the display driver chip and the touch driver chip are integrated as an example, such as the driver chip 700 in FIG. 1, that is, the display function and the touch function are integrated into the driver chip.

It is to be noted that the specific arrangement manner of the touch structure 300 is not limited in the embodiment of the present disclosure. As show in FIG. 1, the touch electrodes 350 include touch drive electrodes 351 and touch sensing electrodes 352, where two adjacent touch drive electrode blocks are electrically connected through a connection across-bridge provided on the same layer thereof, and two adjacent touch sensing electrodes 352 are electrically connected through a connection across-bridge provided on different layers thereof. Alternatively, two adjacent touch drive electrode 351 blocks are electrically connected through a connection across-bridge provided on different layers thereof, and two adjacent touch sensing electrodes 352 are electrically connected through a connection across-bridge provided on different layers thereof, which are not limited in the embodiment of the present disclosure. Similarly, the touch structure 300 may also be self-capacitive manner. No matter what the touch structure 300 is self-capacitive manner or mutual-capacitive manner, the touch structure 300 needs to transmit a touch signal through the touch traces 312 to ensure that the touch structure 300 normally performs a touch function.

It is to be noted that for the touch structure with the mutual-capacitive manner, a touch insulating layer is provided between the two adjacent touch sensing electrodes or the two adjacent touch drive electrodes and the connection across-bridge provided on different layers thereof. In this case, a connection via hole (the connection via hole is not shown in the figure) may be provided in the touch insulating layer located at the display region, and the electrical connection relationship between the two adjacent touch sensing electrodes or the two adjacent touch drive electrodes and the connection across-bridge provided on different layers thereof is achieved through the connection via hole. Alternatively, in the case where the touch electrodes and the touch traces are not disposed on the same layer, similarly, the connection via hole (the connection via hole is not shown) may be provided in the touch insulating layer located at the display region, and the electrical connection relationship between the touch electrodes and the touch traces may be achieved through the connection via hole.

In an embodiment, the non-display region 200 includes a first non-display region 210, a bending region 220 and a second non-display region 230, where the first non-display region 210 is disposed between the bending regions 220 and the display region 100, the bending region 220 is disposed between the first non-display region 210 and the second non-display region 230. For a display panel 10 having the bend region 220, the display panel 10 generally has a flexible substrate, and at least one part of the flexible substrate may be curved or bent. Therefore, in preparing the display device, the periphery region of the non-display pattern of the display panel 10 is bent or hidden on the rear side of the display panel 10, so that the size of the border region of the display panel 10 can be reduced. The curved or bent region of the display panel 10 is the bent region 220 referred to in the embodiment of the present application, and is illustrated in FIG. 1 with the unfolded and unbent bending region 220. the traces in the display panel 10 are bent to the non-display and non-touch side of the display panel 10 in the bending region 220, so that the border region area of the display panel 10 can be reduced, and the area proportion of the display and touch functional region of the display panel 10 can be increased, thereby satisfying the development trend of the display pane narrow border. The second non-display region 230 can be understood as a bonding region, that is, the driver chip 700 is bound to the bonding terminal provided in the display panel in this region. The first non-display region 210 is provided with connection traces to which the driver chip 700 is connected to the display units in the display region 100 and the non-display region 200, and multiple display signal provided by the driver chip 700 can be normally transmitted to the display units in the display region 100 and the non-display region 200 through the connection traces to ensure that the display panel is normal working.

In an embodiment, the first non-display region 210 includes a first sub-non-display region 211, as shown in FIG. 2, the touch insulating layer 310 in the first sub-non-display region 211 includes multiple touch via hole 311, and the number and shape of the touch via holes 311 are not specifically limited in the embodiment of the present disclosure. Referring to FIGS. 3 and 4, the touch structure 300 further includes a first touch layer 330 and a second touch layer 340. The first touch layer 330 or the second touch layer 340 may be electrically connected to the touch signal transmission structure 313 at the bending region 220 through the touch via holes 311. The touch signal transmission structure 313 passes through the bending region 220 to be electrically connected to the driver chip 700 located on the second non-display region 230, so that transmission of the touch drive signal and the touch sensing signal is achieved.

It can be understood that since the touch signal transmission structure 313 needs to be bent in the bending region 220, the material of the touch signal transmission structure 313 may be a metal film having good ductility, such as titanium-aluminum-titanium, so that bending of the touch signal transmission structure 313 to the non-display and non-touch side of the display panel 10 does not influence on a signal transmitted by the touch signal transmission structure 313, thereby ensuring stable transmission of the touch signal. Exemplarily, referring to FIG. 3, the second touch layer 340 is electrically connected to the touch signal transmission structure 313 through the touch via holes 311 as an example, and referring to FIG. 4, the first touch layer 330 is electrically connected to the touch signal transmission structure 313 through the touch via holes 311 as an example. The specific connection manner thereof is not limited in the embodiment of the present disclosure. The mutual-capacitive touch structure shown in FIG. 1 is as an example, the first touch layer 330 may be a film in which the touch drive electrodes 351 and the touch sensing electrodes 352 are located, and the second touch layer 340 may be a film in which the connection across-bridge between two adjacent touch drive electrodes 351 or two adjacent touch sensing electrodes 352 is located; or the first touch layer 330 may be a film in which a connection bridge between two adjacent touch drive electrodes 351 or two adjacent touch sensing electrodes 352 is connected, and the second touch layer 340 may be a film in which the touch control drive electrodes 351 and the touch sensing electrodes 352 are located, in other words, one of the first touch layer 330 and the second touch layer 340 may be the touch electrode layer and the other of the first touch layer 330 and the second touch layer 340 is a across-bridge connection layer, and the embodiment of the present disclosure is not limited thereto.

It is to be noted that in conjunction with FIGS. 3 and 4, the display panel 10 provided in the embodiment of the present disclosure may further include a substrate 130, a buffer layer 111, an inorganic insulating layer 121, an organic insulating layer 112, a third metal layer 113, a planarization layer 114, a pixel defining layer 115, alight-emitting layer 116, a cathode layer 117, an inorganic encapsulation layer 118, an organic encapsulation layer 119, a touch buffer layer 320, and the like. The related those skilled in the art may adaptively adjust the film based on actual requirements, and the embodiment of the present disclosure is not specifically limited thereto.

Further, the first non-display region 210 includes a second sub-non-display region 212, as shown in FIG. 2, the touch insulating layer 310 in the second sub-non-display region 212 includes first hollow portions 213, and the first hollow portions 213 penetrate the touch insulating layer 310. In other words, the first hollow portions 213 are provided to ensure that the touch insulating layer 310 located on the second sub-non-display region 212 is not an overall surface film structure and has hollowed regions. The display panel 10 has an organic film and an inorganic film, and the interface stress between the inorganic film and the organic film is mismatched, which will result in a stress difference between the different films. The touch insulating layer 310 is provided with the first hollow portions 213, and the stress difference between the different films can be released at the first hollow portions 213, so that the films are prevented from being peeled off, and the display effect and the touch effect of the display panel 10 are ensured. Meanwhile, there is a washing step in the preparation process of the display panel 10, and the generated water vapor can be released through the first hollow portions 213 provided in the touch insulating layer 310, so that corrosion of the water vapor to the other metal film is avoided, and the films in the display panel 10 are prevented from being peeled off due to the water vapor, thereby ensuring stability of the display panel 10.

It is to be noted that as shown in FIG. 2, the first sub-non-display region 211 and the second sub-non-display region 212 are partitions of the first non-display region 210, instead of partitioning the displayer 100 and the bending region 120. For ease of illustration, reference numeral of the first sub-non-display region 211 and the second sub-non-display region 212 are shown at the edges. The reference numeral of the first sub-non-display region 211 and the second sub-non-display region 212 are continued in the subsequent drawings, and will not be described later. In summary, in the display panel provided by the embodiment of the present disclosure, the touch insulating layer located in the second sub-non-display region is provided with the first hollow portions, and the first hollow portions are served as a release channel of water vapor and stress, so that the stress and the water vapor generated inside the display panel can be released, thereby avoiding the film peeling off caused by the stress and the water vapor accumulation, and ensuring the display and touch effect of the display panel.

Figure 5:
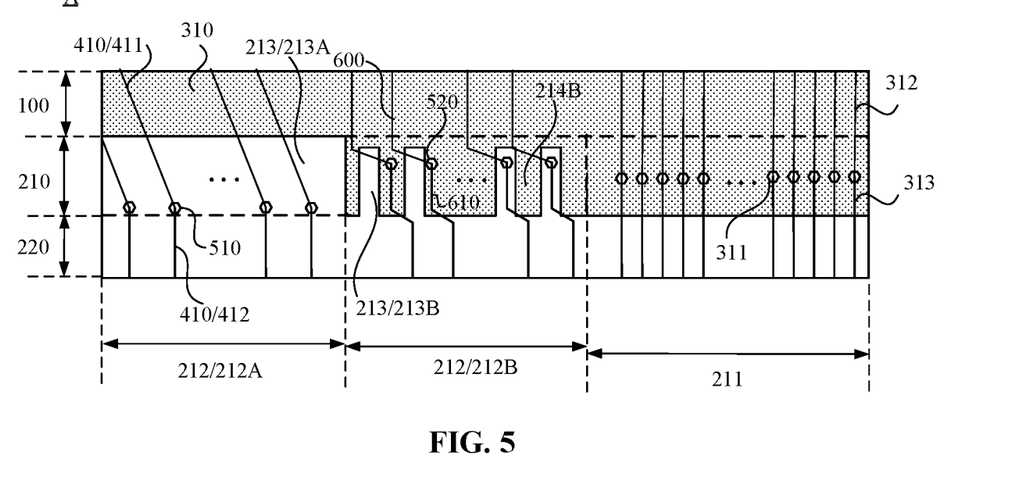
FIG. 5 is another enlarged schematic diagram of a region A in FIG. 1.

FIG. 5 is another enlarged schematic diagram of a region A in FIG. 1. Referring to FIGS. 1, 2 and 5, the display panel 10 further includes a gate drive circuit 400 and a gate drive signal line 410 connected to the gate drive circuit 400, where the gate drive signal line 410 includes a first gate drive line section 411 provided in the first non-display region 210 and a second gate drive line section 412 provided in the bending region 220, and the first gate drive line section 411 and the second gate drive line section 412 are electrically connected through the first connection via holes 510 and disposed in different layers. The second sub-non-display region 212 includes a first sub-region 212A, the first connection via holes 510 are disposed in the first sub-region 212A, and in the first sub-region 212A, the first hollow portions 213 include at least one first sub-hollow portion 213A.

Referring to FIGS. 1, 2, and 5, the display panel 10 further includes a gate drive circuit 400, such as a shift register. The display panel further includes the gate drive signal line 410, one end of the gate drive signal line 410 is electrically connected to the gate drive circuit 400, and the other end of the gate drive signal line 410 is electrically connected to the driver chip 700, the driver chip 700 is used for providing gate drive signals through the gate drive signal line 410, such as a high-level signal VGH, a low level signal VGL, an enable signal STV, and a clock signal CK and XCK, so as to ensure that the gate drive circuit 400 can normal work.

Further, the gate drive signal line 410 includes the first gate drive line section 411 provided at the first non-display region 210 and the second gate drive line section 412 provided in the bending region 220, where the second gate drive line section 412 may extend to the second non-display region 230 in the bending region 220, and the first gate drive line section 411 and the second gate drive line section 412 are located at different film positions of the display panel 10. Further, as shown in FIGS. 2 and 5, the first gate drive line section 411 and the second gate drive line section 412 at different films are connected across layers by providing the first connection via holes 510, so as to ensure stable transmission of signals between the gate drive circuit 400 and driver chip 700 of the display panel 10 in the first non-display region 210 and the bending region 220.

In an embodiment, referring to FIGS. 3 and 4, the inorganic insulating layer 121 is not provided in the bending region 220, that is, a part of the inorganic insulating layer 121 is removed from the bending region 220 so as to reduce the thickness of the bending region 220, and the organic insulating layer 112 relieving stress can be filled at the position where the part of the inorganic insulating layer 121 is removed, so that on the one hand, the bending of the bending region 220 is facilitated, and cracks and the like in the bending region 220 are prevented, on the other hand, the height difference of the display panel in a region removing the inorganic insulating layer 121 is compensated by the organic insulating layer 112, thereby facilitating the planarization of different regions of the display panel. Exemplarily, the inorganic insulating layer 121 may be an interlayer insulating layer, a gate insulating layer, a buffer insulating layer and the like, and the organic insulating layer 112 may be at least one material selected from acrolein, methacrolein, polyester, polyethylene, polypropylene, polyethylene terephthalate, polyethylene naphthalate, polycarbonate, polyimide, polyvinyl sulfonate, polyoxymethylene, polyarylate, or hexamethyldisiloxane. The specific film composition of the inorganic insulating layer and the material of the organic insulating layer are not specifically limited in the embodiment of the present disclosure. Further, the second gate drive line section 412 located in the bending region 220 may be provided on the preferably ductile metal film, and on the basic of removing the inorganic insulating layer 121 in the bending region 220, the second gate drive line section 412 may be better bent to the non-display and non-touch side of the display panel 10 without causing the signal transmitted on the second gate drive line section 412 to be affected, thereby ensuring stable transmission of the signals in the second gate drive line section 412. Further, after line changing is performed on the other traces in the first non-display region 210, it is ensured that the signal transmission effect in the bending region 220 is the same in principle, and details are not described herein. The specific setting positions of the first gate drive line section 411 and the second gate drive line section 412 are not specifically limited in the embodiment of the present disclosure.

Further, referring to FIGS. 2 and 5, the second sub-non-display region 212 includes a first sub-region 212A in which a first connection via hole 510 for connecting the first gate drive line section 411 and the second gate drive line section 412 is provided. Further, the part of the touch insulating layer 310 located in the first sub-region 212A includes at least one first sub-hollow portion 213A. By providing the first sub-hollow portion 213A, the water vapor and the pressure existing in the display panel 10 can be released through the first sub-hollow portion 213A to avoid the film peeling off, and the water vapor can be prevented from corroding the second gate drive line section 412, thereby ensuring stable transmission of signals in the display panel 10 and ensuring stability of the display panel 10.

It is to be noted that the display panel provided by the embodiment of the present disclosure further includes a positive power signal line (such as PVDD, not specifically shown in the figure), a negative power signal line (such as PVEE, not specifically shown in the figure) and a crack detection signal line (not specifically shown in the figure), the positive power signal line, the negative power signal line and the crack detection signal line each include a trace section located in the first non-display region and a trace section located in the bending region, and the trace section located in the first non-display region and the trace section located in the bending region are disposed in different layers and electrically connected through the third connection via holes (not specifically shown in the figure). The arrangement manner is the same as that of the first connection via hole, the third connection via holes are also provided in the first sub-region. By providing the first sub-hollow portion in the first sub-region, the water vapor and the pressure existing in the display panel are released through the first sub-hollow portion, so that the film peeling off is avoided, and the water vapor can be prevented from corroding the positive power signal line, the negative power signal line and the crack detection signal line, thereby ensuring the stable transmission of the signals in the display panel, and ensuring the normal working of the display panel.

Referring to FIG. 5, the first sub-hollow portion 213A covers at least the first sub-region 212A along the thickness direction of the display panel 10.

Referring to FIG. 5, the touch insulation layer 310 located in the first sub-region 212A includes a first sub-hollow portion 213A, and the first sub-hollow portion 213A may cover the first sub-region 212A, that is, along the thickness direction of the display panel 10, the vertical projection of the first sub-hollow portion 213A may overlap the vertical projection of the first sub-region 212A. Further, the touch insulating layer 310 at the first sub-region 212A may be only the first sub-hollow portion 213A, that is, the touch insulating layer 310 is completely hollowed out at the first sub-region 212A, and the touch insulating layer 310 is not present at the first sub-region 212A. The touch insulating layer 310 is not providing in the first sub-region 212A, such as embodied only in the first sub-hollow portion 213A, which can further ensure the discharge of water vapor in the display panel 10, and better release the pressure in the display panel 10, thereby ensuring the stability of the display panel 10. Alternatively, the touch insulating layer 310 at the first sub-region 212A may be partially provided with the first sub-hollow portion 213A, that is, the touch insulating layer 310 is partially hollowed out at the first sub-region 212A, and the touch insulating layer 310 is partially present at the first sub-region 212A. The touch insulating layer 310 is partially provided in the first sub-region 212A, so that it is ensured, on the one hand, that the water vapor is discharged from the display panel 10, and on the other hand, that the touch insulating layer 310 provides effective support protection for the region.

It is to be noted that the thickness direction of the display panel 10 may refer to the thickness direction of the touch insulating layer 310 provided in the non-bent region of the display panel 10, or the vertical light emitting direction of the non-bent display region of the display panel 10, etc. The thickness direction of the display panel in the following embodiments can be understood as such, and details are not described later.

With continued reference to FIG. 2, the first sub-region 212A is provided with multiple first hollow portions 213A and multiple first insulating portions 214A, along the thickness direction of the display panel 10, each first sub-hollow portion at least partially overlaps one first connection via hole 510, and each insulating portion at least partially overlaps a gap between two adjacent first connection via holes.

In an embodiment, the first sub-region 212A includes multiple first sub-hollow portion 213A which hollowed out the touch insulating layer 310 located in the first sub-region 212A, that is, penetrate the touch insulating layer 310, and multiple first insulating portions 214A which are reserved regions of the touch insulating layer 310 in the first sub-region 212A. Further, referring to FIG. 2, along the thickness direction of the display panel 10, the first sub-hollow portion 213A at least partially overlaps the first connection via hole 510, that is, the vertical projection of the first sub-hollow portion 213A overlaps the vertical projection of the first connection via hole 510, so that water vapor transmitting to the first connection via hole 510 can be avoided, that is, corrosion of the traces passing through the first connection via hole 510 is avoided, and stable signal transmission of the display panel 10 is ensured. Meanwhile, referring to FIG. 2, along the thickness direction of the display panel 10, the first insulating portion 214A may be located at a gap between two adjacent first connection via holes 510, that is, the vertical projection of the first insulating portion 214A does not overlap the vertical projections of the two adjacent first connection via holes 510, so that the first insulating portion 214A has a function of protecting the lower film thereof and a function of supporting the upper film thereof, thereby ensuring the structural stability of the display panel 10.

With continued reference to FIGS. 2 and 5, the second sub-non-display region 212 includes a second sub-region 212B in which the first hollow portions 213 include multiple second sub-hollow portions 213B, and in the second sub-region 212B, the touch insulating layer 300 further includes multiple second insulating portions 214B.

The second sub-non-display region 212 further includes the second sub-region 212B, and the second sub-region 212B includes multiple second sub-hollow portions 213B and multiple second insulating portions 214B. The number and shape of the second sub-hollow portions 213B and the second insulating portions 214B are not specifically limited in the embodiment of the present disclosure. Specifically, the second sub-hollow portions 213B hollow out the touch insulating layer 310 located in the second sub-region 212B, that is, penetrate the touch insulating layer 310, and the second insulating portions 214B are reserved regions of the touch insulating layer 310 in the second sub-region 212B. The water vapor or the pressure generated inside the display panel 10 can be released by providing multiple second sub-hollow portions 213B, the stability of the display panel 10 is ensured, and the stability of the signal transmission is ensured, that is, the display and touch effect of the display panel 10 are better achieved. Further, multiple second insulating portions 214B provided have the function for supporting and protecting the other films in the second sub-region 212B, and ensure good overall stability of the display panel 10.

Figure 6:
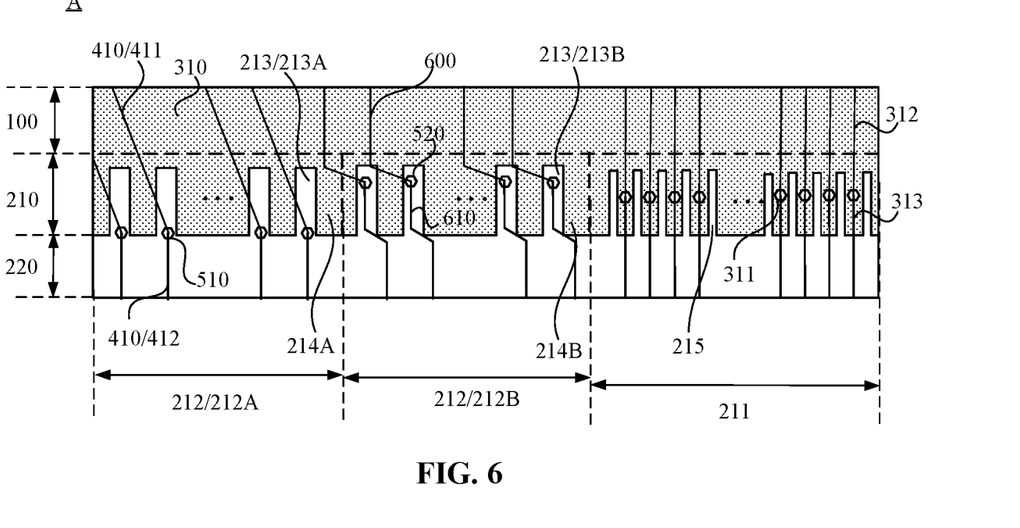
FIG. 6 is another enlarged schematic diagram of a region A in FIG. 1.

FIG. 6 is another enlarged schematic diagram of a region A in FIG. 1. Referring to FIGS. 1 and 6, the display region 100 includes multiple data signal line 600, the display panel 10 further includes multiple data transmission lines 610 located in the second sub-region 212B, and the multiple data transmission lines 610 and the multiple data signal lines 600 are disposed in different layers and electrically connected through the second connection via holes 520. Along the thickness direction of the display panel 10, each second sub-hollow portions 213B at least partially overlaps one second connection via hole 520, and one second insulating portion 214B at least partially overlaps the gap between and two adjacent second connection via holes 520.

The display region 100 further includes multiple data signal lines 600, and the second sub-region 212B of the second sub-non-display region 212 further includes multiple data transmission lines 610. Specifically, the data signal lines 600 are electrically connected to the sub-pixels in the display region 100, the data signal lines 600 are electrically connected to the data transmission lines 610, and the data transmission lines 610 are further electrically connected to the driver chip 700 emitting the display signals, so that the sub-pixels in the display region 100 is driven to emit light, thereby ensuring the overall display function of the display panel 10.

Further, the data signal lines 600 and the data transmission lines 610 are not disposed in the same layer, and two kinds of signal lines can be electrically connected across the film layer through the disposed second connection via holes 520 to ensure the stability of signal transmission. In an embodiment, referring to FIG. 5, along the thickness direction of the display panel 10, the vertical projection of the second sub-hollow portion 213B at least partially overlaps the vertical projection of the second connection via hole 520. Further, along the thickness direction of the display panel 10, the vertical projections of all second sub-hollow portions 213B each overlap the vertical projections of all second connection via holes 520, referring to FIG. 6. Further, if there are n second sub-hollow portions 213B in the second sub-region 212B per unit area, in order to ensure that both the vertical projections of the second sub-hollow portions 213B overlap the vertical projections of the second connection via holes 520, n second connection via holes 520 are provided in the second sub-region 212B, where n is positive integer, which is not specifically limited in the embodiment of the present disclosure. The second sub-hollow portions 213B hollow out the touch insulating layer 310 located in the second sub-region 212B, that is, penetrate the touch insulating layer 310, and the second insulating portions 214B are reserved regions of the touch insulating layer 310 in the second sub-region 212B. The second sub-hollow portion 213B at least partially overlaps the second connection via hole 520, that is, the vertical projection of the second sub-hollow portion 213B overlaps the vertical projection of the second connection via hole 520, so that water vapor transmitting to the second connection via hole 520 can be avoided, that is, corrosion of the traces passing through the second connection via hole 520 is avoided, and stable signal transmission of the display panel 10 is ensured. Meanwhile, along the thickness direction of the display panel 10, the second insulating portion 214B may be located at a gap between two adjacent second connection via holes 520, that is, the vertical projection of the second insulating portion 214B does not overlap the vertical projections of the two adjacent second connection via holes 520, so that the second insulating portion 214B has a function of protecting the lower film thereof and a function of supporting the upper film thereof, thereby ensuring the structural stability of the display panel 10.

Figure 7:
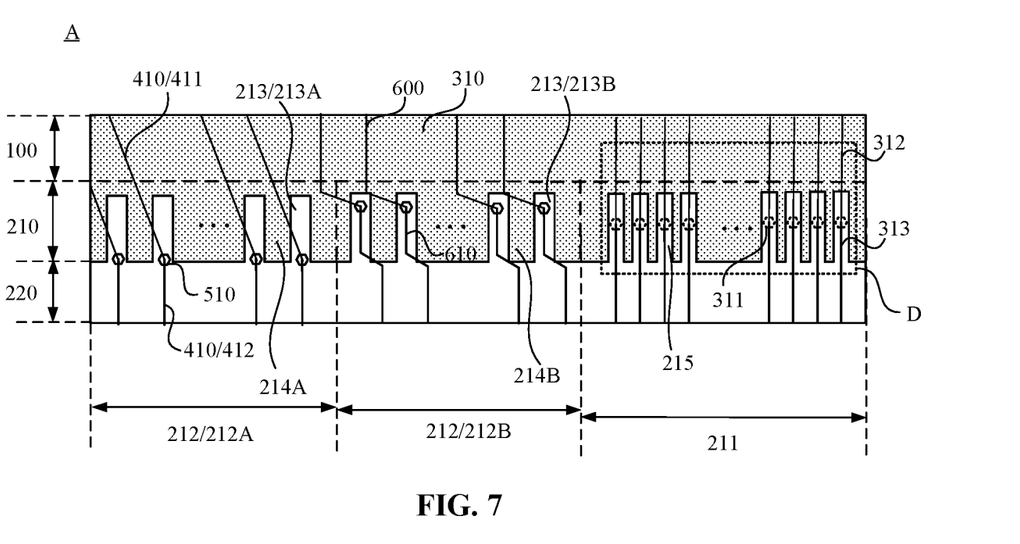
FIG. 7 is another enlarged schematic diagram of a region A in FIG. 1.

FIG. 7 is another enlarged schematic diagram of a region A in FIG. 1. Referring to FIGS. 1, 6 and 7, the touch structure 300 further includes touch traces 312, the display panel 10 further includes a touch signal transmission structure 313 partially located in the first sub-non-display region 211, and the touch signal transmission structure 313 and the touch traces 312 are disposed in different layers and electrically connected through the touch via holes 311. Within the first sub-non-display region 211, the touch insulating layer 310 includes second hollow portions 215, and the second hollow portions 215 penetrate the touch insulating layer 310.

The touch structure 300 further includes the touch traces 312, and a part of the touch control signal transmission structure 313 is located in the first sub-non-display region 211. Specifically, the touch signal transmission structure 313 includes a transmission section located in the first sub-non-display region 211 and a transmission section located in the bending region, and the transmission section located in the first sub-non-display region 211 and the transmission section located in the bending region are integrally provided in the same layer to form a complete touch signal transmission structure. In the touch signal transmission structure 313, the transmission section located in the first sub-non-display region 211 is electrically connected to the touch traces 312 to achieve the touch signal transmission through the touch via holes 311, and the transmission section located in the bending region 220 is bent to the non-display side or non-touch side of the display panel so as to be used for being electrically connected to the driver chip. The driver chip provides the touch drive signal to the touch drive electrode 351 and receives the touch sensing signal fed back by the touch sensing electrode through the touch signal transmission structure 313 and the touch traces 312, thereby achieving the touch function of the display panel 10.

Further, within the first sub-non-display region 211, the touch insulating layer 310 includes second hollow portions 215, and the second hollow portions 215 penetrate the touch insulating layer 310. In other words, the second hollow portions 215 are provided in the first sub-non-display region 211 to ensure that the touch insulating layer 310 located on the first sub-non-display region 211 is not an overall surface film structure and has hollowed regions. It is possible to release the stress difference between the different films at the second hollow portions 215, and it is also possible to use the second hollow portions 215 as water vapor release channels, so that the peeling off films of the display panel caused by the action of the water vapor or the pressure 10 is avoided, the structural stability of the display panel 10 is ensured, and the display and touch functions of the display panel 10 are further ensured.

With continued reference to FIG. 7, at least one second hollow portion 215 is also served as the touch via hole 311.

Further, the second hollow portions 215 penetrate the touch insulating layer 310, and the touch via holes 311 also penetrate the touch insulating layer 310, so that the touch traces 312 and the touch signal transmission structure 313 located at different films are electrically connected across the holes. As shown in FIG. 7, when the touch insulating layer 310 is penetrated based on both the second hollow portions 215 and the touch via holes 311, and the touch via holes 311 overlap the second hollow portions 215 along the thickness direction of the display panel 10, at least one second hollow portion 215 may be reused as the touch via hole 311, and the second hollow portions 215 are reused as the touch via holes 311, which can reduce the preparation technique degree of the display panel 10, thereby saving costs.

It is to be note that since the second hollow portions 215 are the hollow portions provided in the touch insulating layer 310, the touch via holes 311 includes, in addition to the via holes provided in the touch insulating layer 310, the via holes provided in the other films, for example, the via holes provided in the touch buffer layer. Therefore, the at least one second hollow portion 215 is also served as the touch via hole 311, which can be understood that for the hollows and the via holes provided in the touch insulating layer 310, at least one second hollow portion 215 is also served as the touch via hole 311, that is, the second hollow portions 215 are integrated with the touch via holes 311 provided in the touch insulating layer 310.

Figure 8:
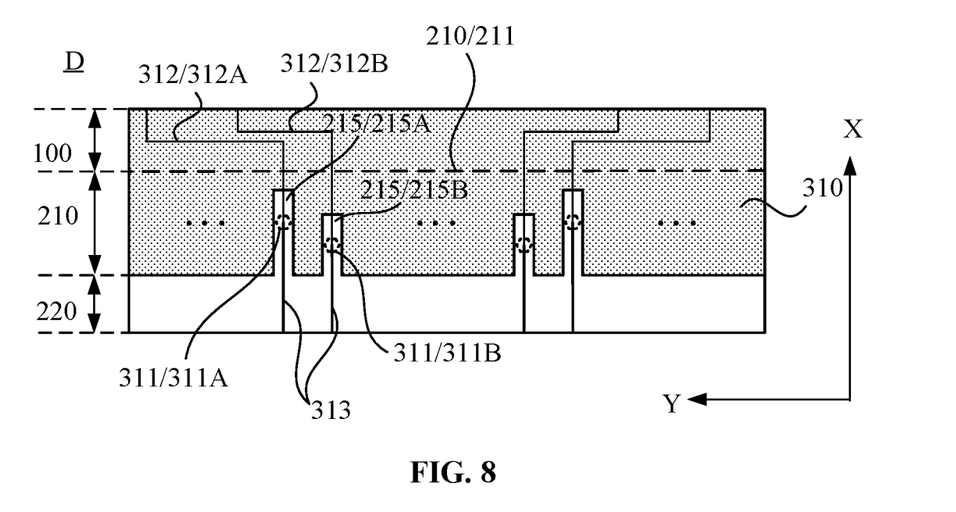
FIG. 8 is an enlarged schematic diagram of a region D in FIG. 7.

On the basis of the preceding embodiments, FIG. 8 is an enlarged schematic diagram of a region D in FIG. 7. Referring to FIG. 8, in any two touch traces 312, a touch trace 312 with a longer extension length is a first touch trace 312A, a touch trace 312 with a shorter extension length is a second touch trace 312B, and the first touch trace 312A is electrically connected to the touch signal transmission structure 313 through the first touch via hole 311A, and the second touch trace 312B is electrically connected to the touch signal transmission structure 313 through the second touch via hole 311B. The first sub-non-display region 211 is provided with multiple second hollow portions 215, and the multiple second hollow portions 215 extend along the first direction X and are arranged along the second direction Y, where the first direction X is parallel to the direction in which the display region 100 is directed toward the non-display region 200, and the second direction Y intersects the first direction X. The multiple second portions 215 include third sub-hollow portions 215A and fourth sub-hollow portions 215B. At least one third sub-hollow portion 215A is also served as the first touch via hole 311A, and at least one fourth sub-hollow portion 215B is also served as the second touch via hole 311B. The block resistance of the touch signal transmission structure 313 is smaller than the block resistance of the touch traces 312, and the first touch via holes 311A are located on the side of the second touch via holes 311B close to the display region 100, and along the first direction X, the extension length of the third sub-hollow portions 215A is larger than the extension length of the fourth sub-hollow portions 215B.

In an embodiment, the touch structure 300 includes multiple touch traces 312 in which touch traces 312 having different extension lengths exists. Referring to FIG. 8, the extension length of the first touch traces 312A is larger than the extension length of the second touch traces 312B, and the extension length may be a sum of the trace lengths of the touch traces 312 along the first direction X and the second direction Y, for example, the trace length of the touch traces 312 close to the edge region of the display panel 10 is longer, or the trace length of the touch traces 312 connected to the touch electrode far away from a side of the first non-display region 210 is longer. In an embodiment, referring to FIG. 8, the first touch traces 312A are closer to the edge than the second touch traces 312B, that is, the extension length of the first touch traces 312A is somewhat longer. Further, the touch via holes 311 includes first touch via hole 311A and second touch via holes 311B, the first touch traces 312A are electrically connected to the touch signal transmission structure 313 through the first touch via holes 311A, and the second touch traces 312B are electrically connected to the touch signal transmission structure 313 through the second touch via holes 311B, thereby achieving transmission of the touch signals of the display panel 10 and ensuring the touch function of the display panel 10.

Further, referring to FIG. 8, the first sub-non-display region 211 is provided with multiple second hollow portions 215, the pressure generated in the first sub-non-display region 211 can be released by providing the second hollow portions 215, and the second hollow portions 215 can also serve as a water vapor release channel to ensure working stability of the display panel 10. Further, the second hollow portions 215 include third sub-hollow portions 215A and fourth sub-hollow portions 215B. Since both the touch via holes 311 and the second hollow portions 215 penetrate the touch insulating layer 310, the third sub-hollow portions 215A are reused as the first touch via holes 311A and the fourth sub-hollow portions 215B are reused as the second touch via holes 311B, therefore, the preparation process and the preparation cost of the display panel 10 can be reduced.

Further, since the extension length of the first touch traces 312A is greater than the extension length of the second touch traces 312B, the transmission loss of the touch signals in the first touch traces 312A is greater than the transmission loss of the touch signals in the second touch traces 312B. The touch signal transmission structure 313 and the touch traces 312 each have a block resistance, which is also referred to as a film resistance, i.e. a resistance value per unit area of a unit thickness of the conductive material. The difference in metal material selection based on the touch signal transmission structure 313 and the touch traces 312, or the difference in the thickness of the films of the touch signal transmission structure 313 and the touch traces 312, results in a difference in the block resistance of the touch signal transmission structure 313 and the touch traces 312. Exemplarily, the touch signal transmission structure 313 and the touch traces 312 are made of titanium-aluminum-titanium materials, and the thickness of the titanium metal layer and the aluminum metal layer are different, so that the block resistances of the touch signal transmission structure 313 and the touch traces 312 are different, which is not specifically limited in the embodiment of the present disclosure. Specifically, the block resistance of the touch signal transmission structure 313 is smaller than the block resistance of the touch traces 312 so that it is ensured that the transmission losses of the touch signals on different transmission paths are the same or similar by adjusting the positions of the touch via holes connected to the touch traces 312 and the touch signal transmission structure 313. Specifically, referring to FIG. 8, the first touch via holes 311A are located on the side of the second touch via holes 311B close to the display region 100, that is, the touch signal transmitted by the first touch traces 312A can be transmitted more in the touch signal transmission structure 313 than the touch signal transmitted by the second touch traces 312B. The larger transmission losses of the first touch traces 312A are compensated by the smaller transmission loss in the touch signal transmission structure 313, so that the transmission losses of the touch signal on different transmission paths are the same or similar. Further, at least one third sub-hollow portion 215A is also served as the first touch via hole 311A and at least one fourth sub-hollow portion 215B is also served as the second touch via hole 311B, so that the extension length of the third sub-hollow portion 215A is greater than the extension length of the fourth sub-hollow portion 215B, thereby ensuring that the touch signals in the first touch traces 312A are more transmitted in the touch signal transmission structure 313, compensating for transmission loss differences of the touch signals in different transmission channels, and ensuring that the overall touch effect of the display panel is balanced.

Figure 9:
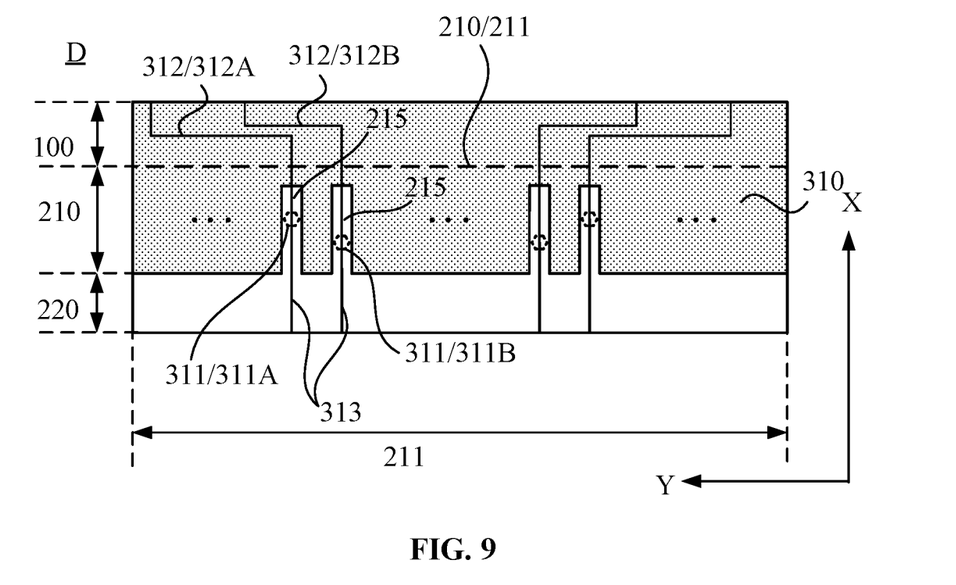
FIG. 9 is another enlarged schematic diagram of a region D in FIG. 7.

FIG. 9 is another enlarged schematic diagram of a region D in FIG. 7. Referring to FIG. 9, in any two touch traces 312, a touch trace 312 with a longer extension length is a first touch trace 312A, a touch trace 312 with a shorter extension length is a second touch trace 312B, and the first touch trace 312A is electrically connected to the touch signal transmission structure 313 through the first touch via hole 311A, and the second touch trace 312B is electrically connected to the touch signal transmission structure 313 through the second touch via hole 311B. The first sub-non-display region 211 is provided with multiple second hollow portions 215, and the multiple second hollow portions 215 extend along the first direction X and are arranged along the second direction Y, where the first direction X is parallel to the direction in which the display region 100 is directed toward the non-display region 200, and the second direction Y intersects the first direction X. The block resistance of the touch signal transmission structure 313 is smaller than the block resistance of the touch traces 312, and the first touch via holes 311A are located on the side of the second touch via holes 311B close to the display region 100, and along the first direction X, the extension lengths of any two second hollow portions 215 are the same.

Further, since the extension length of the first touch traces 312A is greater than the extension length of the second touch traces 312B, the transmission loss of the touch signals in the first touch traces 312A is greater than the transmission loss of the touch signals in the second touch traces 312B. Since the block resistance of the touch signal transmission structure 313 is smaller than the block resistance of the touch traces 312, it is ensured that the transmission losses of the touch signals on different transmission paths are the same or similar by adjusting the positions of the touch via holes connected to the touch traces 312 and the touch signal transmission structure 313. Specifically, referring to FIG. 9, the first touch via holes 311A are located on the side of the second touch via holes 311B close to the display region 100, that is, the touch signal transmitted by the first touch traces 312A can be transmitted more in the touch signal transmission structure 313 than the touch signal transmitted by the second touch traces 312B. The larger transmission losses of the first touch traces 312A are compensated by the smaller transmission loss in the touch signal transmission structure 313, so that the transmission losses of the touch signal on different transmission paths are the same or similar. Further, the positions of the touch via holes 311 are adjusted, and the touch via holes 311 at different positions are correspondingly adjusted to correspond to the second hollow portions 215 with the same extension length, so as to ensure that the second hollow portions 215 can cover the touch via holes 311, and at the same time ensure that the arrangement manner of the second hollow portions 215 is simple, thus reducing the technique cost of preparing the display panel 10.

Figure 10:
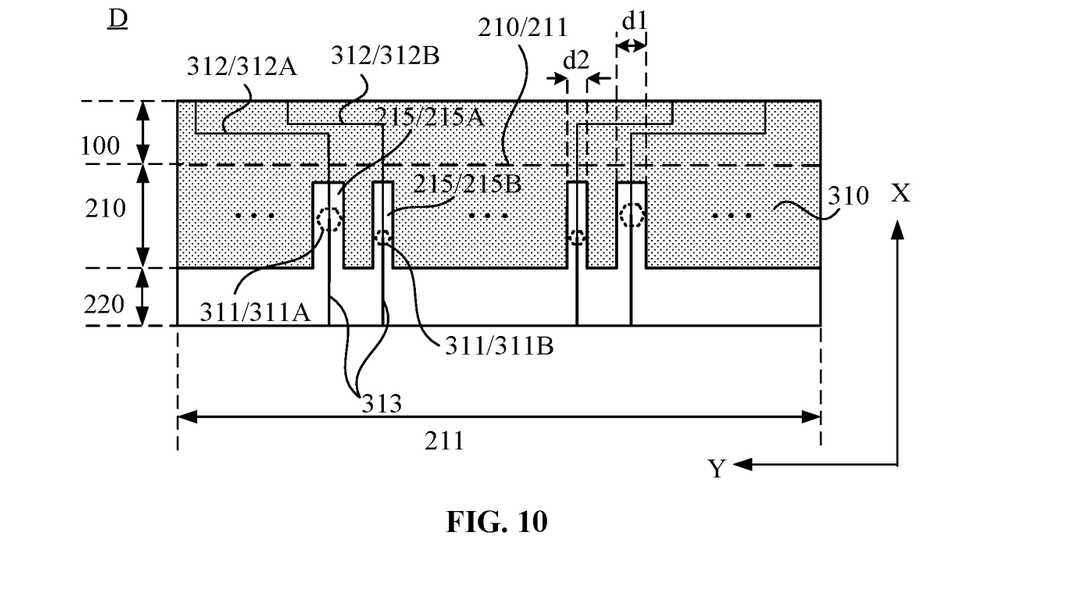
FIG. 10 is another enlarged schematic diagram of a region D in FIG. 7.

FIG. 10 is another enlarged schematic diagram of a region D in FIG. 7. Referring to FIG. 10, in any two touch traces 312, a touch trace 312 with a longer extension length is a first touch trace 312A, a touch trace 312 with a shorter extension length is a second touch trace 312B, and the first touch trace 312A is electrically connected to the touch signal transmission structure 313 through the first touch via hole 311A, and the second touch trace 312B is electrically connected to the touch signal transmission structure 313 through the second touch via hole 311B. The first sub-non-display region 211 is provided with multiple second hollow portions 215, and the multiple second hollow portions 215 extend along the first direction X and are arranged along the second direction Y, where the first direction X is parallel to the direction in which the display region 100 is directed toward the non-display region 200, and the second direction Y intersects the first direction X. The multiple second portions 215 include third sub-hollow portions 215A and fourth sub-hollow portions 215B. At least one third sub-hollow portion 215A is also served as the first touch via hole 311A, and at least one fourth sub-hollow portion 215B is also served as the second touch via hole 311B. The opening size of the first touch via hole 311A is greater than the opening size of the second touch via hole 311B, and along the second direction Y, the extension width of the third sub-hollow portions 215A is larger than the extension width of the fourth sub-hollow portions 215B.

Further, since the extension length of the first touch traces 312A is greater than the extension length of the second touch traces 312B, the transmission loss of the touch signals in the first touch traces 312A is greater than the transmission loss of the touch signals in the second touch traces 312B. Since the block resistance of the touch signal transmission structure 313 is smaller than the block resistance of the touch traces 312, it is ensured that the transmission losses of the touch signals on different transmission paths are the same or similar by adjusting the magnitudes of the touch via holes connected to the touch traces 312 and the touch signal transmission structure 313. Specifically, referring to FIG. 10, the opening size of the first touch via hole 311A is larger than the opening size of the second touch via hole 311B, and the differentiation of the resistance values on the different touch via holes 311 is achieved by adjusting the magnitude of the opening size. Because the extension length of the first touch traces 312A is longer, the resistance value at the first touch via holes 311A is achieved on the basic of adjusting the magnitude of the opening sizes of the touch via holes 311, so that the transmission loss is reduced, the transmission losses of the touch signal on different transmission paths are ensured to be the same or similar, and the overall stability of the display panel 10 is ensured. Further, the magnitude of the opening sizes of the touch via holes 311 is adjusted, the third sub-hollow portions 215A are reused as the first touch via holes 311A and the fourth sub-hollow portions 215B are reused as the second touch via holes 311B, so that the sizes of the third sub-hollow portions 215A and the fourth sub-hollow portions 215B are adjusted adaptively. Specifically, along the second direction Y, the extension width of the third sub-hollows 215A is larger than the extension width of the fourth sub-hollows 215B, that is, d1 is larger than d2 in the figure, so that the second hollow portions 215 can cover the touch via holes, and at the same time, it is ensured that the arrangement manner of the hollow portions is simple, and the technique cost of preparing the display panel 10 is reduced.

Figure 11:
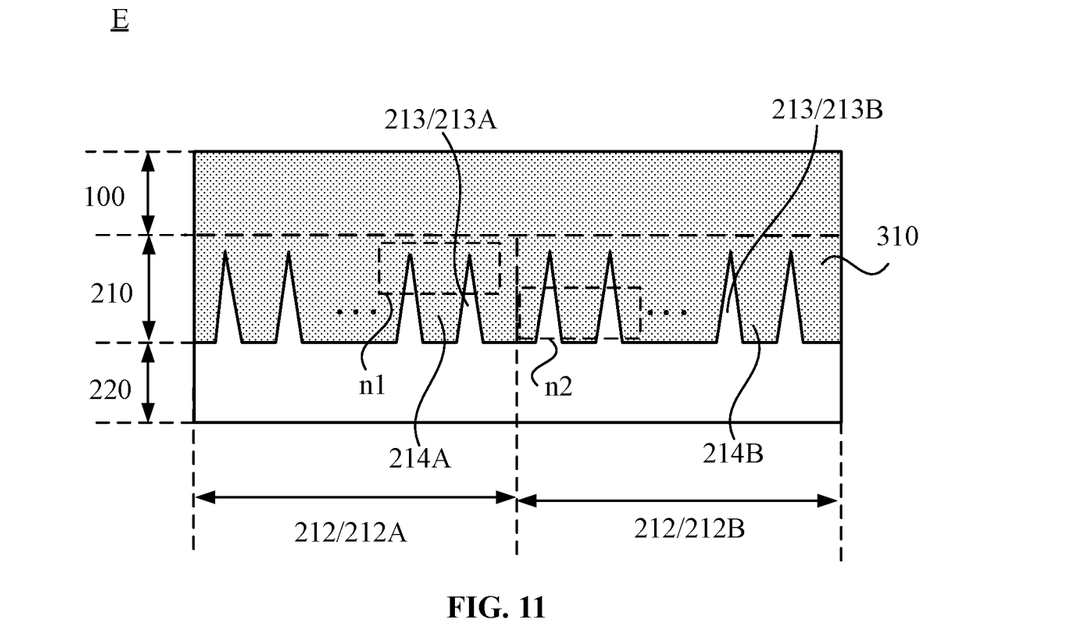
FIG. 11 is an enlarged schematic diagram of a region E in FIG. 2.
Figure 12:
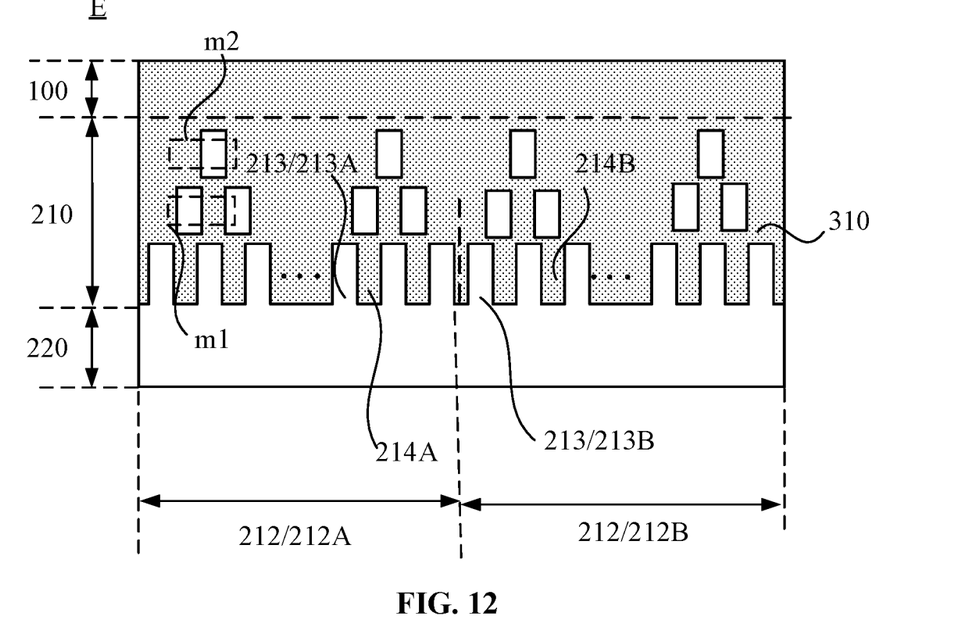
FIG. 12 is another enlarged schematic diagram of a region E in FIG. 2.
Figure 13:
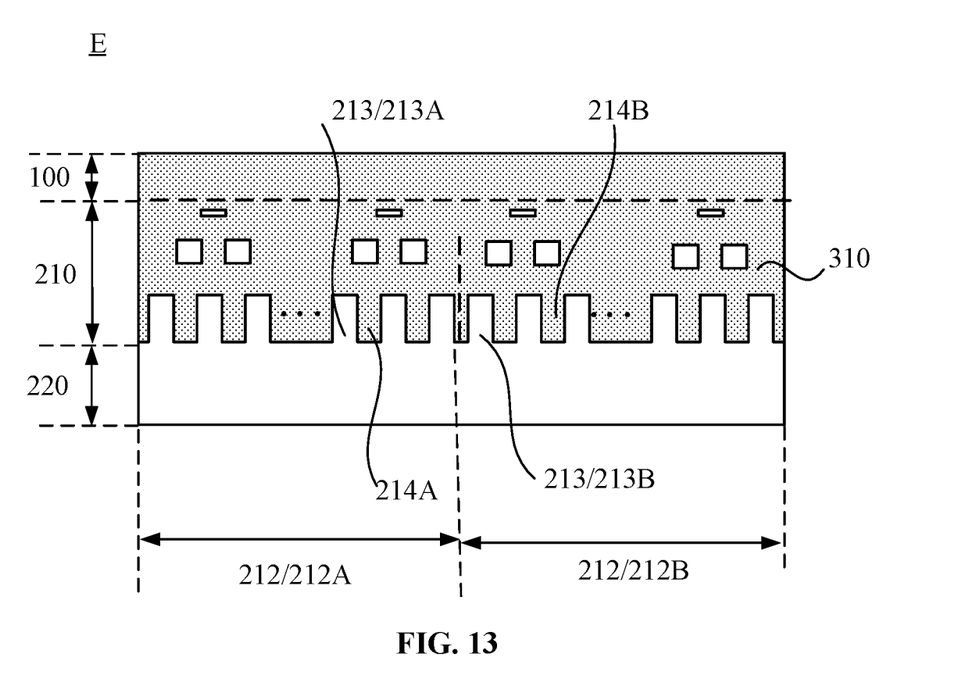
FIG. 13 is another enlarged schematic diagram of a region E in FIG. 2.

FIG. 11 is an enlarged schematic diagram of a region E in FIG. 2, FIG. 12 is another enlarged schematic diagram of a region E in FIG. 2, and FIG. 13 is another enlarged schematic diagram of a region E in FIG. 2. Referring to FIGS. 11 to 13, the sum of the hollow areas of the first hollow portions 213 close to the side of the display region 100 side in the second sub-non-display region 212 is smaller than the sum of the hollow areas of the first hollow portions 213 far away from the side of the display region 100 in the second sub-non-display region 212.

Due to the existence of the bending region 220, the touch insulating layer 310 on the side far away from the display region 110 in the second sub-non-display region 212 is more easily warped due to the water vapor and the stress action, thereby forming the peeling of the film. By adaptively adjusting the sum of the hollow areas at different positions in the second sub-non-display region 212, the stability of the film in the display panel 10 is ensured, and the structural stability of the display panel 10 is ensured.

In an embodiment, referring to FIGS. 11 to 13, since the film on the side far away from the display region 100 in the second sub-non-display region 212 is more easily peeled off in response to the stress and the water vapor, the sum of the hollow areas of the first hollow portions 213 on the side close to the display region 100 in the second sub-non-display region 212 is set to be smaller than the sum of the hollow areas of the first hollow portions 213 on the side far away from the display region 100 in the second sub-display region 212, that is, by increasing the sum of the hollow areas of the touch insulating layer 310 on the side far away from the display region 100, the release of the pressure and the water vapor is better ensured, and the structural stability of the display panel 10 is ensured.

In an embodiment, taking FIG. 11 as an example, in a region n1 and a region n2 which have an equal area in FIG. 11, the region n1 is closer to the display region 100 side than the region n2, and the sum of the hollow areas in the region n1 is smaller than the sum of the hollow areas in the region n2. It is to be noted that in FIG. 11, the triangular first hollow regions 213 are exemplified, and the shape and size of the actual first hollow regions 213 are varied, such as a regular trapezoid, and which is not specifically limited in the embodiment of the present disclosure.

It is to be noted that FIGS. 11 to 13 are only for showing the arrangement manner shown of the hollow areas of the touch insulating layer 310, and the connection via holes and traces are not shown.

Further, the sum of the hollow areas may also have a tendency to be set gradually, referring to FIGS. 12 and 13. That is, the overall hollow area of the first hollow portions 213 is increased on the side far away from the display region 100, the release channels of the stress and the water vapor are increased, the risk of warping and peeling of the touch insulating layer 310 on the side of the bending region 220 is reduced, the problem of easy warping and peeling of the touch insulating layer 310 and the like is solved, and the structural stability of the display panel 10 is ensured.

With continued reference to FIGS. 12 and 13, the distribution density of the first hollow portions 213 on the side close to the display region 100 in the second sub-region 212B is smaller than the distribution density of the first hollow portions 213 on the side far away from the display region 100 in the second sub-region 212B; and/or, the hollow areas of the first hollow portions 213 on the side close to the display region 100 in the second sub-region 212B is smaller than the hollow areas of the first hollow portions 213 on the side far away from the display region 100 in the second sub-region 212B.

In an embodiment, in order to satisfy that the sum of the hollow areas of the first hollow portions 213 on the side close to the display region 100 in the second sub-region 212B is smaller than the sum of the hollow areas of the first hollow portions 213 on the side far away from the display region 100 in the second sub-region 213B, the setting density or the sizes of the first hollow portions 213 can be adjusted.

In an embodiment, referring to FIG. 12, the setting number of the first hollow portions 213 on the side close to the display region 100 in the second sub-region 212B is less than the setting number of the first hollow portions 213 on the side far away from the display region 100 in the second sub-region 212B, so that the sum of the hollow areas on the side close to the display region 100 is smaller than the sum of the hollow areas on the side far from the display region 100.

In an embodiment, referring to FIG. 13, the size of the first hollow portions 213 on the side close to the display region 100 in the second sub-region 212B is smaller than the size of the first hollow portions 213 on the side far away from the display region 100 in the second sub-region 212B, so that the sum of the hollow areas on the side close to the display region 100 is smaller than the sum of the hollow areas on the side far from the display region 100. Further, referring to FIG. 13, the size of the first hollow portions 213 on the side close to the display region 100 in the second sub-region 212B is smaller than the size of the first hollow portions 213 on the side far away from the display region 100 in the second sub-region 212B, meanwhile, the setting number of the first hollow portions 213 on the side close to the display region 100 in the second sub-region 212B is less than the setting number of the first hollow portions 213 on the side far away from the display region 100 in the second sub-region 212B. In summary, the setting of the first hollow portions 213 is varied and can be applied to different display panels 10.

Further, referring to FIG. 13, along the direction in which the display region 100 is directed toward the non-display region 200, the sum of the hollow areas of the first hollow portions 213 in the second sub-region 212B increases gradually within a unit area.

In an embodiment, referring to FIG. 11, in a region n1 and a region n2 which have an equal area in FIG. 11, the region n1 is closer to the display region 100 side than the region n2, and the sum of the hollow areas in the region n1 is smaller than the sum of the hollow areas in the region n2. Further, in the region n1 or the region n2, the hollow areas on the side close to the display region 100 is smaller than the hollow areas on the side far away from the display region 100, that is, the change tendency of the sum of the hollow areas of the touch insulating layer 310 is gradually changed.

In an embodiment, referring to FIGS. 12 and 13, a region m1 and a region m2 which have an equal area exist in FIG. 12, the region m1 is further away from the display region 100 side than the region m2, and the sum of the hollow areas in the region m1 is smaller than the sum of the hollow areas in the region m2. However, in the region m1 or the region m2, the hollow areas on the side close to the display region 100 is smaller than the hollow areas on the side far away from the display region 100, that is, the change in the hollow areas in FIG. 12 is in a gradient manner. In summary, the setting of the first hollow portions 213 is varied and can be applied to different display panels 10.

With continued reference to FIG. 2, the second sub-non-display region 212 includes multiple first hollow portions 213 and multiple insulating portions 214A or 214B where multiple first hollow portions 213 extend along the first direction X and are arranged along the second direction Y, and multiple insulating portions 214A or 214B extend along the first direction X and are arranged along the second direction Y. An insulating portion 214A or 214B is provided between any two adjacent first hollow portions 213 along the second direction Y. The first direction X is parallel to the direction in which the display region 100 is directed toward the non-display region 200, and the second direction Y intersects the first direction X.

The second sub-non-display region 212 includes multiple first hollow portions 213 and multiple insulating portions 214A or 214B, and specifically includes multiple first insulating portions 214A in the first sub-region 212A and multiple second insulating portions 214B in the second sub-region 212B. Referring to FIG. 2, multiple first hollow portions 213 extend along the first direction X, and the first insulating portion 214A or the second insulating portion 214B is provided between any two adjacent first hollow portions 213, that is, multiple first hollow portions 213 and multiple insulating portions 214A or 214B in the second sub-non-display region 212 are similar in shape to a strip-shaped "anchor" structure. By this arrangement manner, the stability of the first hollow portions 213 and the insulating portions 214A or 214B is ensured, and the overall flatness of the display panel 10 is ensured while the stress or the water vapor is released, and the stability of the overall structure of the display panel 10 is ensured.

Figure 14:
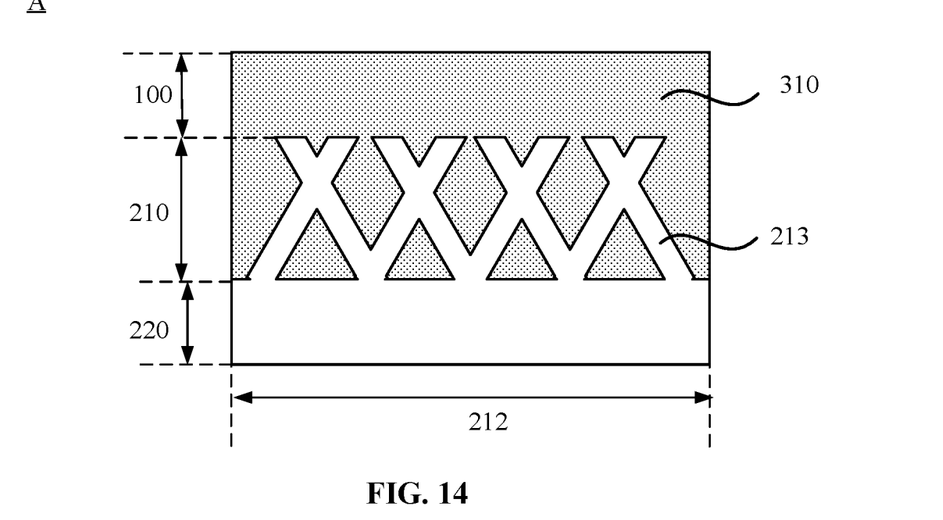
FIG. 14 is another enlarged schematic diagram of a region A in FIG. 1.

FIG. 14 is another enlarged schematic diagram of a region A in FIG. 1. Referring to FIG. 14, the second sub-non-display region 212 includes the touch insulating layer 310 in a grid shape, and the first hollow portions 213 are grids of the touch insulating layer 310.

Specifically, referring to FIG. 14, the touch insulating layer 310 of the second sub-non-display region 212 may be a grid structure. For example, the first hollow portions 213 may be grid portions of the grid touch insulating layer 310, instead of the hollow regions, for example, the insulating regions may be mesh portions of the grid touch insulating layer 310. The arrangement manner of the touch insulating layer 310 can be enriched by providing the second sub-non-display region 212 including the grid touch insulating layer 310, and the release of the water vapor and pressure and the stability of the structure of the display panel 10 can also be ensured.

Figure 15:
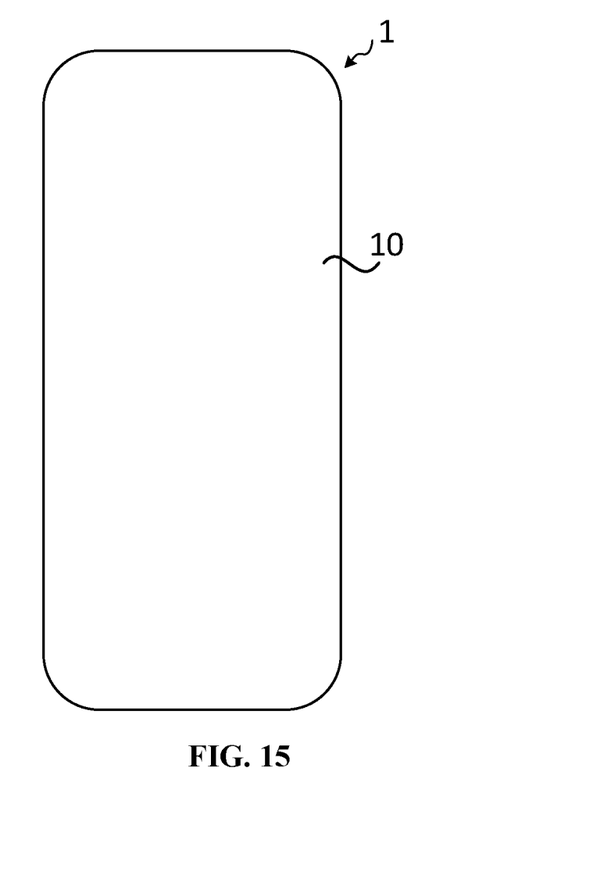
FIG. 15 is a structure diagram of a display device according to an embodiment of the present disclosure.

Based on the same concept, the embodiment of the present disclosure further provides a display device. FIG. 15 is a structural diagram of a display device according to an embodiment of the present disclosure. As shown in FIG. 15, the display device 1 includes the display panel 100 provided in any of the preceding embodiments, thereby having the same beneficial effects as the preceding embodiments. Details are not described herein. Exemplarily, the display device 1 may be a mobile phone, a computer, a smart wearable device (e.g., a smart watch), an in-vehicle display device, or the like electronic device. Specifically, the display device 1 may also be a liquid crystal displayer, an electro-phoretic displayer, an organic light-emitting displayer, an inorganic light-emitting displayer, a field emission displayer, a surface conduct electron emission displayer, a plasma displayer, a cathode-ray displayer, or the like, which is not specifically limited in the embodiment of the present disclosure.

It is to be noted that the preceding are only preferred embodiments of the present disclosure and the technical principles used therein. It is to be understood by those skilled in the art that the present disclosure is not limited to the embodiments described herein. For those skilled in the art, various apparent modifications, adaptations and substitutions can be made without departing from the scope of the present disclosure. Therefore, while the present disclosure is described in detail in connection with the preceding embodiments, the present disclosure is not limited to the preceding embodiments and may include equivalent embodiments without departing from the concept of the present disclosure. The scope of the present disclosure is determined by the scope of the appended claims.

What is claimed is:

1. A display panel, comprising:
   a touch structure, wherein the touch structure comprises a touch insulating layer; and
   a display region and a non-display region, wherein the non-display region comprises a first non-display region and a bending region, and the first non-display region is located between the bending region and the display region;
   wherein the first non-display region comprises a first sub-non-display region and a second sub-non-display region, and wherein within the first sub-non-display region, the touch insulating layer comprises a plurality of touch via holes, and within the second sub-non-display region, the touch insulating layer comprises a first hollow portion, and the first hollow portion penetrates the touch insulating layer.

2. The display panel of claim 1, further comprising a gate drive circuit and a gate drive signal line connected to the gate drive circuit;
   wherein the gate drive signal line comprises a first gate drive line section and a second gate drive line section, the first gate drive line section is disposed in the first non-display region and the second gate drive line section is disposed in the bending region, the first gate drive line section and the second gate drive line section are disposed in different layers and electrically connected through a first connection via hole; and wherein the second sub-non-display region comprises a first sub-region, the first connection via hole is disposed in the first sub-region, and within the first sub-region, the first hollow portion comprises at least one first sub-hollow portion.

3. The display panel of claim 2, wherein the at least one first sub-hollow portion covers at least part of the first sub-region along a thickness direction of the display panel.

4. The display panel of claim 2, wherein a plurality of first sub-hollow portions and a plurality of first insulating portions are disposed in the first sub-region; and along a thickness direction of the display panel, a first sub-hollow portion of the plurality of first sub-hollow portions at least partially overlaps the first connection via hole, and a first insulating portion of the plurality of first insulating portions at least partially overlaps a gap between two adjacent first connection via holes.

5. The display panel of claim 1, wherein the second sub-non-display region comprises a second sub-region, and within the second sub-region, the first hollow portion comprises a plurality of second sub-hollow portions; and within the second sub-region, the touch insulating layer further comprises a plurality of second insulating portions.

6. The display panel of claim 5, wherein the display region comprises a plurality of data signal lines;

the display panel further comprises a plurality of data transmission lines located in the second sub-region, the plurality of data transmission lines and the plurality of data signal lines are disposed in different layers, and a data transmission line of the plurality of data transmission lines and a data signal line of the plurality of data signal lines is electrically connected through a second connection via hole; and along a thickness direction of the display panel, a second sub-hollow portion of the plurality of second sub-hollow portions at least partially overlaps the second connection via hole, and one second insulating portion of the plurality of second insulating portions at least partially overlaps a gap between two adjacent second connection via holes.

7. The display panel of claim 1, wherein the touch structure further comprises a touch trace;

the display panel further comprises a touch signal transmission structure partially located in the first sub-non-display region, and the touch signal transmission structure and the touch trace are disposed in different layer and electrically connected through a touch via hole of the plurality of touch via holes; and within the first sub-non-display region, the touch insulating layer comprises a second hollow portion, and the second hollow portion penetrates the touch insulating layer.

8. The display panel of claim 7, wherein at least one second hollow portion is also served as the touch via hole.

9. The display panel of claim 8, wherein in two touch traces, a touch trace with longer extension length of the two touch trances is a first touch trace, and a touch trace with shorter extension length of the two touch traces is a second touch trace, and wherein the first touch trace is electrically connected to the touch signal transmission structure through a first touch via hole, and the second touch trace is electrically connected to the touch signal transmission structure through a second touch via hole;

wherein a plurality of second hollow portions are disposed in the first sub-non-display region, the plurality of second hollow portions extend along a first direction and are arranged along a second direction, the first direction is parallel to a direction in which the display region is directed toward the non-display region, and the second direction intersects the first direction, the plurality of second hollow portions comprise a third sub-hollow portion and a fourth sub-hollow portion, at least one third sub-hollow portion is also served as the first touch via hole, and at least one the fourth sub-hollow portion is also served as the second touch via hole; and wherein a block resistance of the touch signal transmission structure is smaller than a block resistance of the touch trace, and the first touch via hole is located on a side of the second touch via hole close to the display region, and along the first direction, an extension length of the third sub-hollow portion is larger than an extension length of the fourth sub-hollow portion.

10. The display panel of claim 8, wherein in two touch traces, a touch trace with longer extension length of the two touch trances is a first touch trace, a touch trace with shorter extension length of the two touch traces is a second touch trace, the first touch trace is electrically connected to the touch signal transmission structure through a first touch via hole, and the second touch trace is electrically connected to the touch signal transmission structure through a second touch via hole;

a plurality of second hollow portions are disposed in the first sub-non-display region, the plurality of second hollow portions extend along a first direction and are arranged along a second direction, the first direction is parallel to a direction in which the display region is directed toward the non-display region, and the second direction intersects the first direction; and a block resistance of the touch signal transmission structure is smaller than a block resistance of the touch trace, and the first touch via hole is located on a side of the second touch via hole close to the display region, and along the first direction, extension lengths of two second sub-hollow portions of the plurality of second sub-hollow portions are the same.

11. The display panel of claim 8, wherein in two touch traces, a touch trace with longer extension length of the two touch trances is a first touch trace, a touch trace with shorter extension length of the two touch traces is a second touch trace, the first touch trace is electrically connected to the touch signal transmission structure through a first touch via hole, and the second touch trace is electrically connected to the touch signal transmission structure through a second touch via hole;

a plurality of second hollow portions are disposed in the first sub-non-display region, the plurality of second hollow portions extend along a first direction and are arranged along a second direction, the first direction is parallel to a direction in which the display region is directed toward the non-display region, and the second direction intersects the first direction, the plurality of second hollow portions comprise a third sub-hollow portion and a fourth sub-hollow portion, at least one third sub-hollow portion is also served as the first touch via hole, and at least one the fourth sub-hollow portion is also served as the second touch via hole; and an opening size of the first touch via hole is larger than an opening size of the second touch via hole, and along the second direction, an extension width of the third sub-hollow portion is larger than an extension width of the fourth sub-hollow portion.

12. The display panel of claim 1, wherein within per unit area, a sum of hollow areas of first hollow portions on a side close to the display region in the second sub-non-display region is smaller than a sum of hollow areas of first hollow portions on a side far away from the display region in the second sub-non-display region.

13. The display panel of claim 12, wherein the display panel satisfies at least one of:
   a distribution density of the first hollow portions on the side close to the display region in the second sub-non-display region is smaller than a distribution density of the first hollow portions on the side far away from the display region in the second sub-non-display region; or
   a hollow area of each first hollow portion of the first hollow portions on the side close to the display region in the second sub-non-display region is smaller than a hollow area of each first hollow portion of the first hollow portions on the side far away from the display region in the second sub-non-display region.

14. The display panel of claim 12, wherein a sum of hollow areas of first hollows portions is gradually increased per unit area along a direction in which the display region is directed toward the non-display region.

15. The display panel of claim 1, wherein the second sub-non-display region comprises a plurality of first hollow portions and a plurality of insulating portions; and
   the plurality of first hollow portions extend along a first direction and are arranged along a second direction, the plurality of insulating portions extend along the first direction and are arranged along the second direction, an insulating portion of the plurality of insulating portions is disposed between two adjacent first hollow portion of the plurality of first hollow portions along the second direction, the first direction is parallel to a direction in which the display region is directed toward the non-display region, and the second direction intersects the first direction.

16. The display panel of claim 1, wherein the second sub-non-display region comprises the touch insulating layer in a grid shape, and the first hollow portion is a grid of the touch insulating layer.

17. A display device, comprising a display panel,
   wherein the display panel comprises:
   a touch structure, wherein the touch structure comprises a touch insulating layer; and
   a display region and a non-display region, wherein the non-display region comprises a first non-display region and a bending region, and the first non-display region is located between the bending region and the display region;
   wherein the first non-display region comprises a first sub-non-display region and a second sub-non-display region, and wherein within the first sub-non-display region, the touch insulating layer comprises a plurality of touch via holes, and within the second sub-non-display region, the touch insulating layer comprises a first hollow portion, and the first hollow portion penetrates the touch insulating layer.

* * * * *